United States Patent Office 3,509,226
Patented Apr. 28, 1970

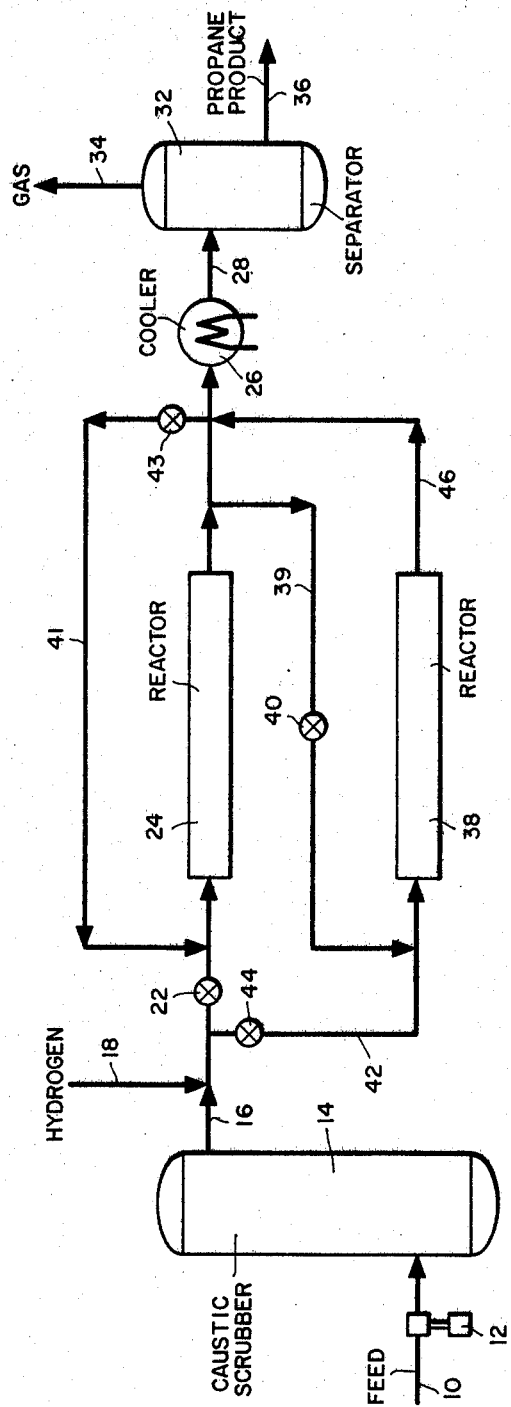

3,509,226
PROCESS FOR HYDROGENATING PROPYLENE
Jackson Eng, Sarnia, Ontario, Canada, assignor to Esso Research and Engineering Company, a corporation of Delaware
Filed May 25, 1966, Ser. No. 552,756
Int. Cl. C07c 9/08, 5/02
U.S. Cl. 260—676    6 Claims

ABSTRACT OF THE DISCLOSURE

This disclosure relates to a process for hydrogenating propylene to propane in the liquid phase in the presence of a reduced nickel catalyst.

---

This invention relates to hydrogenating propylene and to the treatment of $C_3$ hydrocarbon-containing streams to remove propylene therefrom.

Refinery propane streams frequently contain propylene due to contamination or to combined processing arrangements. For example, when a propylene fraction containing propane is polymerized to $C_{12}$ tetramer, the propane does not polymerize and after going through the polymerization plant, it is sold as LPG. Unfortunately, complete conversion of propylene in the polymerization plant is not achieved and as a result the unreacted propane may contain as much as 10% propylene. In some cases the recovered $C_3$ stream contains 15 to 20% propylene.

Propylene is not a desirable component in propane that is to be used as LPG fuel for heavy duty vehicles. Propylene has 102 Research and 85 motor octane numbers compared to propane which has 111 Research and 97 motor octane numbers. If knocking is to be avoided and maximum fuel utilization is to be obtained, propylene content should be as low as possible. ASTM D–2154–63T specifies a maximum of 12% but LPG supplied from some gas processing plants and crude fields has <1.0% propylene. Competition from this source is increasing and refineries may be forced to supply equivalent quality product although many users do not require such low level propylene content LPG for satisfactory performance.

Another factor that may enter into the picture is the future demand for low sensitivity gasoline. Polymer gasoline has a sensitivity of 14 and processing will be required to lower the sensitivity before incorporating into motor gasoline. Thus, it might be cheaper to hydrogenate propylene to propane and sell it as LPG than to polymerize propylene to polymer gasoline followed by upgrading before blending into motor gasoline.

The present invention describes a simple and cheap process for saturating or hydrogenating propylene to produce propane or to hydrogenate mixtures containing propylene to remove the propylene. $C_3$'s from a coker, catalytic cracker, polymerization plant, etc. are scrubbed with caustic to remove any hydrogen sulfide or carbonyl sulfide that may be present in the stream. The caustic scrubber may or may not be necessary depending on how adequate the fractionation is in the light ends plant in separating $H_2S$ and COS from the $C_3$ stream.

A stoichiometric amount of hydrogen or more is added and the $C_3$-hydrogen mixture is passed through a catalyst bed packed in sections in a pipe. Two separate sections or reactors are included to permit regeneration or change of catalyst in one section without terminating operation. No furnace is required since the reaction will initiate at ambient or room temperature as low as 70° F. with a reduced nickel on kieselguhr catalyst. Since the reaction is exothermic, a cooler is installed to cool the reactor effluent. If high concentrations of propylene are hydrogenated, the catalyst bed may be split into several parts with cooling between to control reaction temperature or part of the product can be recycled to dilute the olefinic content of the fresh feed. The separator is a small pot which serves only to flash off any excess hydrogen gas and any methane and ethane if hydrogen from the Powerformer is used as treat gas. The propane product will contain between zero and 2 weight percent propylene.

The drawing represents a diagrammatic showing of one form of apparatus adapted to carry out the invention.

Referring now to the drawing, the reference character 10 designates a line with a pump 12 for feeding a $C_3$ hydrocarbon-containing stream into a caustic scrubber 14. The $C_3$ stream comprises a propylene-propane fraction separated from coker products, catalytically cracked products, polymerization products etc. Where the stream consists essentially of propane and propylene, the stream may contain 5 to 25 volume percent of propylene. Streams containing higher concentration can also be processed by recycling some of the saturated product and combining with the fresh feed to maintain the propylene concentration below 25% or by using multi-bed or general reactors with cooling between the beds or reactors. Small amounts of methane, ethane, butane, etc. may be present but the total of these extraneous gases is generally below 5 volume percent. The quantity of these extraneous components that can be tolerated is generally dictated by ASTM specifications such as vapor pressure and 95% evaporated temperature for LPG (ASTM D–1835).

As a nickel catalyst is used in the hydrogenation step, the propylene containing stream must be substantially sulfur free because the nickel catalyst is poisoned by sulfur. The caustic scrubber 14 removes any hydrogen sulfide or carbonyl sulfide which may be present in the feed stream. However, the scrubber may be omitted where the propylene feed stream is substantially free of sulfur compounds.

In the present process, the hydrogenation is initiated under pressure and a sufficiently low temperature so that the $C_3$ hydrocarbon stream is in liquid phase, as data will be presented hereinafter to show an advantage for the liquid phase.

The scrubbed product or feed leaves the scrubber 14 through line 16 under a pressure of between 200 and 800 p.s.i.g. and at ambient or room temperature. The feed is not heated. No furnace is necessary to heat the feed as the reaction will start at as low as 70° F. to 80° F. Hydrogen or hydrogen-containing gas in an amount between about 100 and 1000 s.c.f./b. of feed and under a pressure of about 200 to 800 p.s.i.g. and at ambient temperature is introduced through line 18 into the scrubbed feed in line 16 and the mixture passed through valve 22 into reactor 24. The reactor contains a hydrogenation catalyst such as reduced nickel (metal) on kieselguhr. Preferably more than the stoichiometric amount of hydrogen is added and this amounts to at least 10% excess hydrogen. The space velocity of the propylene-containing feed is between about 5 and 50 v./v./hr. (volume of liquid gas feed per volume of catalyst per hour).

The reaction in the reactor 24 is exothermic and it is necessary to cool the hydrogenated products leaving the reactor 24. The reaction products are at a temperature of about 125° F. to 400° F. and are passed through a cooler 26 to reduce the temperature of the hydrogenated product to about −10° F. to 30° F. The cooled product is passed through line 28 under a pressure of about 200 to 500 p.s.i.g. to separator 32 where gas is separated from liquid and the gas is withdrawn overhead through line 34. The propane liquid product is withdrawn through line 36. The gas contains hydrogen, methane, ethane and propane. The quantity of methane and ethane are generally in trace amounts unless reformer hydrogen is used. The quantity of propane depends on the operating efficiency of the separator. To minimize the amount of propane in the gas stream, a tower equipped with trays operating at low temperatures may be employed.

A second reactor 38 is provided so that when it becomes necessary to regenerate the catalyst or replace it or change reactors for any reason, the second reactor 38 can be used for replacement. A separate line 42 joins line 16 and second reactor 38. Valve 44 in line 42 is opened and valve 22 in line 16 closed to divert flow of the stream from the first reactor 24 to the second reactor 38. Outlet line 46 from the second reactor leads into line 28 ahead of the cooler 26. The first reactor 24 can then be replaced by another reactor or the catalyst regenerated or replaced by fresh catalyst.

A more desirable operation would be to operate the two reactors in series when required. To get maximum life out of the catalyst, the process should be operated with the following reactor sequence. When the effluent from reactor 24 shows a propylene content exceeding 5 mol percent, reactor 38 will be commissioned to take the effluent from 24 through valved line 39. The reactors will run in series until reactor 24 gives no more hydrogenation of propylene. Reactor 24 will then be taken off the line by closing valve 22, the catalyst regenerated or replaced and held in readiness while reactor 38 operates alone. When effluent from reactor 38 exceeds 5% propylene, then reactor 24 will be put in series via valved line 42 taking the effluent from 38, repeating the sequence as described.

For a reasonably low cost process for saturating propylene-containing streams, it was felt that the process should:

(1) Operate at available hydrogen pressure so that a compressor will not be required. Where this is not possible, a compressor is needed.

(2) Use close to stoichiometric amounts of hydrogen treat gas depending on the amount of propylene to be hydrogenated so as to conserve hydrogen and facilitate easy recovery of propane.

(3) Does not require expensive facilities to remove heat of hydrogenation.

The best catalyst is reduced nickel (metal) on kieselguhr. The amount of nickel is between about 40 and 70 weight percent. For this catalyst the operating conditions are 70° F. inlet temperature, 300-350 p.s.i.g., 10 to 15 LHSV (liquid hourly space velocity or v./v./hr.), 425-500 s.c.f. (standard cubic feet) of $H_2$/barrel of feed to give a catalyst life of 45 barrels of feed per pound of catalyst when hydrogenating a $C_3$ hydrocarbon stream containing about 20 weight percent of propylene. Or the hydrogen rate may be 10% excess of stoichiometric or about 360 s.c.f./b. but here there is an indication that catalyst life will be less.

Up to about 45% excess of stoichiometric amounts of hydrogen may be used. A greater excess of hydrogen can be used but renders the process more expensive.

Propylene-containing feeds containing about 20 weight percent propylene were hydrogenated over 15 cc. reduced nickel on kieselguhr catalyst (58 weight percent Ni) packed in a ½ inch diameter reactor. The actual catalyst bed length was 10 inches. The operating pressure was 300 p.s.i.g., space velocity was 20 liquid v./v./hr. and the hydrogen rate was maintained at 10% excess of stoichiometric requirements. Poorer results are obtained when comparing these results to other results obtained using 45% excess of stoichiometric amounts of hydrogen. Catalyst life was about half of that obtained in the higher excess hydrogen treat run. To insure adequate catalyst life, at least about 425 s.c.f./b. of a 20 weight percent propylene feed (32% excess hydrogen) should be used. With lower amount of propylene in the feed, less exothermic heat is produced and less excess hydrogen in terms of s.c.f./b. can be used.

Catalyst can be reduced to nickel in the unit instead of using pre-reduced nickel catalyst by gradually heating the kieselguhr catalyst containing nickel oxide over a 3 hour period to 850° F. and maintaining it at that temperature for 5 hours while passing hydrogen over the catalyst.

The present invention discloses that saturation of propylene is more favorable at liquid phase conditions. In order to conduct the experiment at about isothermal conditions, the nickel on kieselguhr catalyst (8 to 12 mesh) was diluted with an equal volume of inerts such as ceramic beads of about the same size as the catalyst particles and the entire reactor containing the catalyst and inerts was immersed in a constant temperature oil bath. Feed space velocity was maintained at high rates ranging from 20 to 47 v./v./hr. to utilize the entire amount of catalyst and to magnify any differences in the results between the operations. The results obtained are summarized in Table 1. In this case the reactor was vertical and the propylene feed and hydrogen were fed into the top of the vertical reactor.

TABLE 1.—LIQUID VERSUS VAPOR PHASE HYDROGENATION OF PROPYLENE-PROPANE STREAM

Nickel on kieselguhr catalyst (44 wt. % Ni), 20 wt. percent propylene feed, <1 p.p.m. S, 300 p.s.i.g., approx. 400 s.c.f. $H_2$/bbl. feed

| Treat | Catalyst hours | Catalyst temperature, ° F. | | | Liquid feed rate * v./v./hr. | Propylene saturation, percent |
|---|---|---|---|---|---|---|
| | | Top | Middle | Bottom | | |
| Liquid phase condition | 29-33 | 97 | 81 | 77 | 20 | 99 |
| | 64-68 | 99 | 95 | 81 | 40 | 100 |
| | 88-92 | 92 | 109 | 96 | 47 | 99.5 |
| Vapor phase conditions | 112-116 | 268 | 266 | 238 | 47 | 86 |
| | 151-157 | 253 | 251 | 245 | 22 | 82 |

* Based on volume of unreduced catalyst. Catalyst hydrogen reduced in reactor before using.

A low sulfur (less than 1 p.p.m.) feed containing 20 weight percent propylene and the rest propane was hydrogenated using two unheated but well insulated reactors connected in series with an uninsulated line to permit cooling of the reactants after the first reactor to control the heat evolved by the reaction. The run employed pure hydrogen treat gas of 425 s.c.f./b., 15 cc. of reduced nickel metal (58 weight percent nickel of the catalyst) on kieselguhr catalyst in each reactor and a pressure of 350 p.s.i.g The liquid feed rate was 450 cc./hr. giving an overall space velocity of 15 v./v./hr. About 1000 hours of operation could be carried out on this low sulfur feed before propylene saturation started to significantly decrease from 100%. If the permissible propylene content of the product is assumed to be 4 weight percent (80% saturation of 20 weight percent propylene feed), catalyst life would be 1225 hours or equivalent to about 45 barrels of feed per pound of catalyst.

A pilot unit was equipped with an adiabatic reactor containing 100 cc. of nickel oxide on kieselguhr catalyst pills, the amount of nickel as metal being 44 weight percent of the catalyst. The catalyst bed was divided into three sections. About 100 cc. of the nickel oxide catalyst were mixed with 200 cc. of ceramic beads and the mixture distributed in 3 sections containing 14, 39 and 47 cc. of catalyst respectively, each section separated by beads. The catalyst was reduced with hydrogen at 850°

F. prior to processing the propylene-containing stream. The data are shown in Table 2.

TABLE 2.—HYDROGENATION OF PROPYLENE STREAM

[Total run length 116 hours]

44 wt. percent nickel on kieselguhr catalyst reduced prior to processing feed

| | Composition, wt. percent | | | | | Percent C3— conversion |
|---|---|---|---|---|---|---|
| LHSV [1] | C2 and lighter | C3— | C3 | C4 | C5+ | |
| Feed | 1.1 | 20.0 | 78.7 | 0.2 | | |
| 3.4 | 2.1 | 0.1 | 97.4 | 0.3 | 0.1 | 99.4 |
| 4.6 | 2.2 | <0.1 | 97.1 | 0.7 | | 99.9 |
| 6.9 | 1.9 | <0.1 | 97.7 | 0.4 | | 99.9 |
| Feed | 1.8 | 23.6 | 74.3 | 0.3 | | |
| 9.3 | 2.6 | 0.1 | 96.9 | 0.4 | | 99.6 |
| 14.7 | 2.4 | 0.7 | 96.6 | 0.3 | | 96.9 |
| 19.9 | 2.3 | 0.8 | 96.1 | 0.8 | | 96.6 |

[1] Other conditions are 350 p.s.i.g., approx. 425 s.c.f. Powerformer hydrogen/B (32% excess of stoichiometric requirements). Inlet temp. 75° F. rising to 300–400° F. range in catalyst bed. Space velocity based on volume of unreduced catalyst.

Table 2 shows that with a space velocity as high as 10 LHSV, propylene saturation was greater than 99% and propylene content of the hydrogenated product was 0.1 weight percent or less. At 15 to 20 LHSV or v./v./hr., propylene conversion dropped to 97% with the hydrogenated products showing about 0.8 weight percent propylene.

Temperature rise in the catalyst bed was quite substantial. Peak temperatures of about 400° F. were recorded. Calculations indicated that about 40% of the heat generated from hydrogenation was dissipated in vaporizing the hydrocarbon feed and about 10% of the heat lost to the surroundings. The remaining heat generated goes to heating the stream to almost 400° F. Because the propylene hydrogenation reaction can be initiated at ambient temperatures of about 75° F., the large amount of heat released is tolerable without requiring expensive reactor systems such as multi-catalyst bed with cold hydrogen interbed quenches.

Although temperature rise in the bed was considerable in these experiments, the hydrogenated products did not show any large increases in the amount of $C_4$ and $C_5$ hydrocarbons; but the products contained some low boiling hydrocarbons that were not present in the hydrocarbon feed. These light materials included hydrogen, methane, and ethane which were extracted from the Powerformer hydrogen treat gas.

What is claimed is:

1. A method of hydrogenating propylene to produce propane which comprises passing hydrogen-containing gas and a substantially sulfur-free $C_3$ hydrocarbon stream containing propylene under a pressure of at least 200 p.s.i.g. to maintain the stream in liquid phase and at ambient temperature into a reaction zone containing reduced nickel catalyst, withdrawing and cooling the resulting hydrogenated stream and recovering propane therefrom.

2. A method according to claim 1 wherein the amount of hydrogen-containing gas is between about 100 and 1000 s.c.f./b. of the $C_3$ hydrocarbon feed.

3. A method according to claim 1 wherein said catalyst comprises reduced nickel or kieselguhr catalyst with the amount of nickel being between about 40 and 70 weight percent of the nickel plus kieselguhr.

4. A method according to claim 3 wherein the catalyst comprises reduced nickel on kieselguhr catalyst with the amount of reduced nickel being between about 44 and 58 weight percent.

5. A method according to claim 1 wherein said ambient temperature is between about 70° F. and 80° F. and said stream contains up to 25 volume percent of propylene and the rest substantially propane.

6. A method of removing propylene from propane-propylene containing mixtures which comprises passing hydrogen and a substantially sulfur-free propylene-containing mixture at ambient temperature and in liquid phase over a reduced nickel catalyst at a space velocity between about 3 and 10 v./v./hr., cooling the reaction products and separating propane substantially free of propylene.

References Cited

UNITED STATES PATENTS

| | | | |
|---|---|---|---|
| 3,239,453 | 3/1966 | Halik et al. | 260—677 |
| 3,178,373 | 4/1965 | Groebe | 252—459 |
| 2,955,090 | 10/1960 | Richards | 252—455 |
| 3,264,364 | 8/1966 | Hewett et al. | 260—683 |
| 1,044,334 | 3/1944 | Holmes et al. | 260—677 |

OTHER REFERENCES

"An Improved Experimental Reactor for Applied Kinetic Studies," Thomas K. Perkins and Howard F. Rose (Univ. of Texas, Austin), A.I. Ch. E. Journal 4.

DELBERT E. GANTZ, Primary Examiner

J. M. NELSON, Assistant Examiner

U.S. Cl. X.R.

260—683.9